United States Patent
Wang et al.

(10) Patent No.: US 12,337,237 B2
(45) Date of Patent: Jun. 24, 2025

(54) VIRTUAL PROP CONTROL METHOD AND APPARATUS, COMPUTER DEVICE, AND STORAGE MEDIUM

(71) Applicant: Tencent Technology (Shenzhen) Company Limited, Shenzhen (CN)

(72) Inventors: Yang Wang, Shenzhen (CN); Lijie Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 278 days.

(21) Appl. No.: 17/976,696

(22) Filed: Oct. 28, 2022

(65) Prior Publication Data

US 2023/0046750 A1 Feb. 16, 2023

Related U.S. Application Data

(63) Continuation of application No. PCT/CN2021/120871, filed on Sep. 27, 2021.

(30) Foreign Application Priority Data

Nov. 6, 2020 (CN) .......................... 202011231176.X

(51) Int. Cl.
*A63F 13/56* (2014.01)
*A63F 13/837* (2014.01)

(52) U.S. Cl.
CPC ............ *A63F 13/56* (2014.09); *A63F 13/837* (2014.09); *A63F 2300/6607* (2013.01); *A63F 2300/8076* (2013.01)

(58) Field of Classification Search
CPC .................. A63F 13/56; A63F 13/822; A63F 2300/6607; A63F 13/837;
(Continued)

(56) References Cited

U.S. PATENT DOCUMENTS 6,773,349 B2 * 8/2004 Hussaini ................. A63F 13/92
463/37
7,552,399 B2 * 6/2009 Muller .................. G06F 3/0486
715/810
(Continued)

FOREIGN PATENT DOCUMENTS

CN 110721469 A 1/2020
CN 110812837 A 2/2020
(Continued)

OTHER PUBLICATIONS

CN 110721469 A, machine translation, copyright 2024 Clarivate Analytics, downloaded from PE2E—Search Sep. 20, 2024.*
(Continued)

*Primary Examiner* — David L Lewis
*Assistant Examiner* — Matthew D Hoel
(74) *Attorney, Agent, or Firm* — Morgan, Lewis & Bockius LLP

(57) ABSTRACT

This application discloses a virtual prop control method performed by a computer device, and a storage medium. In this application, a controlled virtual object is sheltered by equipping the controlled virtual object with a movable virtual shelter prop, so as to avoid the controlled virtual object being directly exposed in a virtual scene and being attacked by other virtual objects. Moreover, the virtual shelter prop is capable of moving with the controlled virtual object. When the controlled virtual object runs, jumps, etc., the virtual shelter prop may also play a role in defending against an attack, thereby effectively improving the security of the controlled virtual object in competitive battles and improving the user experience. In addition, the controlled virtual object is capable of erecting a target virtual prop at a reference position of the virtual shelter prop held by the
(Continued)

controlled virtual object to launch an attack against other virtual objects.

17 Claims, 9 Drawing Sheets

(58) Field of Classification Search
CPC .............. A63F 2300/8078; A63F 13/52; A63F 2300/8076; A63F 13/525; A63F 13/55; A63F 2300/6063
See application file for complete search history.

(56) References Cited

U.S. PATENT DOCUMENTS

| | | | | |
|---|---|---|---|---|
| 7,565,618 | B2* | 7/2009 | Sheasby | G06F 3/0486 715/769 |
| 8,038,533 | B2* | 10/2011 | Tsuchiyama | A63F 13/323 463/42 |
| 8,719,730 | B2* | 5/2014 | Ganetakos | A63F 13/537 715/834 |
| 8,777,746 | B2* | 7/2014 | Watkins, Jr. | A63F 13/2145 463/37 |
| 8,882,590 | B2* | 11/2014 | Shimura | A63F 13/49 463/31 |
| 9,044,683 | B2* | 6/2015 | Rom | A63F 13/23 |
| 9,174,128 | B2* | 11/2015 | Guthridge | A63F 13/795 |
| 10,543,429 | B2* | 1/2020 | Kojima | A63F 13/54 |
| 11,656,755 | B2* | 5/2023 | Pan | A63F 13/55 715/769 |
| 11,786,817 | B2* | 10/2023 | Liu | A63F 13/833 463/31 |
| 2004/0023719 | A1* | 2/2004 | Hussaini | A63F 13/92 463/37 |
| 2004/0229695 | A1* | 11/2004 | Hussaini | A63F 13/24 463/38 |
| 2005/0026695 | A1* | 2/2005 | Tsuchiyama | A63F 13/30 463/42 |
| 2005/0166159 | A1* | 7/2005 | Mondry | G06F 3/0486 715/769 |
| 2007/0150834 | A1* | 6/2007 | Muller | G06F 3/0486 715/810 |
| 2007/0173334 | A1* | 7/2007 | Whitby | A63F 13/98 463/47 |
| 2007/0265081 | A1* | 11/2007 | Shimura | A63F 13/426 463/37 |
| 2011/0265041 | A1* | 10/2011 | Ganetakos | A63F 13/533 715/834 |
| 2013/0079140 | A1* | 3/2013 | Watkins, Jr. | A63F 13/42 463/37 |
| 2013/0288757 | A1* | 10/2013 | Guthridge | A63F 13/67 463/2 |
| 2013/0288759 | A1* | 10/2013 | Rom | A63F 13/61 463/7 |
| 2013/0290884 | A1* | 10/2013 | Sotoike | A63F 13/42 715/765 |
| 2017/0291106 | A1* | 10/2017 | Rom | A63F 13/23 |
| 2017/0340977 | A1* | 11/2017 | Guthridge | A63F 13/795 |
| 2018/0050265 | A1* | 2/2018 | Wada | A63F 13/214 |
| 2022/0152501 | A1* | 5/2022 | Liu | A63F 13/58 |
| 2022/0152508 | A1* | 5/2022 | Liu | A63F 13/833 |
| 2023/0405466 | A1* | 12/2023 | Liu | A63F 13/57 |

FOREIGN PATENT DOCUMENTS

| | | |
|---|---|---|
| CN | 111013141 A | 4/2020 |
| CN | 111084988 A | 5/2020 |
| CN | 112221142 A | 1/2021 |
| JP | 2015157089 A | 9/2015 |
| JP | 2019106220 A | 6/2019 |

OTHER PUBLICATIONS

Tencent Technology, Isr, PCT/CN2021/120871, Jan. 6, 2022, 2 pgs.
Awymans13, et al. "Rainbow Six Wiki Montagne", Sep. 12, 2020, 12 pgs., Retrieved from the Internet: https://rainbowsix.fandom.com/wiki/Montagne?oldid=77924.
Tencent Technology, WO, PCT/CN2021/120871, Jan. 6, 2022, 5 pgs.
Tencent Technology, IPRP, PCT/CN2021/120871, May 8, 2023, 6 pgs.

* cited by examiner

VIRTUAL PROP CONTROL METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2021/120871, entitled "VIRTUAL PROP CONTROL METHOD AND APPARATUS, COMPUTER DEVICE, AND STORAGE MEDIUM" filed on Sep. 27, 2021, which claims priority to Chinese Patent Application No. 202011231176.X, filed with the State Intellectual Property Office of the People's Republic of China on Nov. 6, 2020, and entitled "VIRTUAL PROP CONTROL METHOD AND APPARATUS, COMPUTER DEVICE, AND STORAGE MEDIUM", all of which are incorporated herein by reference in their entirety.

FIELD OF THE TECHNOLOGY

This application relates to the field of computer technologies, and in particular, to a virtual prop control method and apparatus, a computer device, and a storage medium.

BACKGROUND OF THE DISCLOSURE

With the development of computer technologies and diversification of terminal functions, more and more network games have emerged, and shooting games become a very important category of the network games. In the shooting games, virtual objects may avoid being attacked by other virtual objects by means of shelters such as houses, stones and trees in a virtual scene. That is, the virtual objects need to be adjusted in position by acquiring various movement operation instructions, so as to move behind the shelters to avoid the attack. However, more data will be processed for the position adjustment by various movement operation instructions, which is prone to waste of resources.

SUMMARY

Embodiments of this application provide a virtual prop control method and apparatus, a computer device, and a storage medium, and the technical solutions are as follows:

According to an aspect, a virtual prop control method is performed by a computer device. The method includes:
  displaying, in response to an equipment operation on a virtual shelter prop, the virtual shelter prop at a first position of a controlled virtual object in a virtual scene, the virtual shelter prop being used for sheltering the controlled virtual object to defend against an attack; and
  determining a corresponding behavior type of the controlled virtual object in response to detecting a behavior of the controlled virtual object in the virtual scene and displaying that the virtual shelter prop moves with the controlled virtual object in the virtual scene based on the corresponding behavior type of the controlled virtual object.

According to an aspect, a virtual prop control apparatus is provided. The apparatus includes:
  a first display module, configured to display, in response to an equipment operation on a virtual shelter prop, the virtual shelter prop at a first position of a controlled virtual object in a virtual scene, the virtual shelter prop being used for sheltering the controlled virtual object to defend against an attack; and
  a second display module, configured to determining a corresponding behavior type of the controlled virtual object in response to detecting a behavior of the controlled virtual object in the virtual scene and displaying that the virtual shelter prop moves with the controlled virtual object in the virtual scene based on the corresponding behavior type of the controlled virtual object.

In one implementation, the controlled virtual object is equipped with a target virtual prop for launching an attack on other virtual objects.

The apparatus further includes a type determining module for determining an interaction type corresponding to the controlled virtual object in response to an interaction initiated by the controlled virtual object to the other virtual objects using the target virtual prop.

The apparatus further includes an update module for updating a display state of the virtual shelter prop in the virtual scene based on the interaction type.

In one implementation, the update module is configured to perform any one of the following:
  moving the virtual shelter prop to a second position of the controlled virtual object for display in response to the interaction type being a first interaction type, and displaying that the virtual shelter prop at the second position does not shelter the target virtual prop; and
  erecting the target virtual prop at a reference position of the virtual shelter prop in response to the interaction type being a second interaction type, and zooming in and displaying the virtual shelter prop.

In one implementation, the apparatus further includes:
  a region determining module, configured to determine a hit region on the virtual shelter prop in response to the virtual shelter prop of the controlled virtual object being hit, different hit regions on the virtual shelter prop corresponding to different damage information and hit effects, the hit effects including an audio effect and a visual effect;
  a damage determining module, configured to determine damage information of the virtual shelter prop based on the hit region on the virtual shelter prop; and
  a third display module, configured to display a hit effect corresponding to the hit region in the virtual scene.

In one implementation, the virtual shelter prop corresponds to at least one collision detector for detecting an attack on the virtual shelter prop.

The region determining module is configured to acquire, in response to any one collision detector detecting that the virtual shelter prop is attacked, a reference region indicated on the virtual shelter prop by this collision detector; and determine the reference region as the hit region.

In one implementation, the apparatus further includes:
  an attack triggering module, configured to trigger, in response to a distance between the controlled virtual object and other virtual objects being smaller than or equal to a reference distance, the controlled virtual object to attack the other virtual objects using the virtual shelter prop.

According to an aspect, a computer device is provided. The computer device included one or more processors and one or more memories. The one or more memories stores at least one computer program, and the at least one computer program is loaded and executed by the one or more processors to cause the computer device to implement the operations performed in the virtual prop control method.

According to an aspect, a non-transitory computer-readable storage medium is provided. The non-transitory computer-readable storage medium stores at least one computer program, and the at least one computer program is loaded and executed by a processor of a computer device to cause the computer device to implement the operations performed in the virtual prop control method.

According to an aspect, a computer program product is provided. The computer program product includes a computer program, and the computer program is stored in a non-transitory computer-readable storage medium. A processor of a computer device reads the computer program from the non-transitory computer-readable storage medium, and the processor executes the computer program, to cause the computer device to implement the operations performed in the virtual prop control method.

According to the technical solutions provided by the embodiments of this application, a controlled virtual object is sheltered by equipping the controlled virtual object with a movable virtual shelter prop, so as to avoid the controlled virtual object being directly exposed in a virtual scene and being attacked by other virtual objects. Moreover, position adjustment through various movement operation instructions can be avoided, thereby avoiding generating redundant data processing procedures and reducing waste of resources. Moreover, the virtual shelter prop is capable of moving with the controlled virtual object. When the controlled virtual object runs, jumps, etc., the virtual shelter prop may also play a role in defending against an attack, thereby effectively improving the security of the controlled virtual object in competitive battles and improving the user experience.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
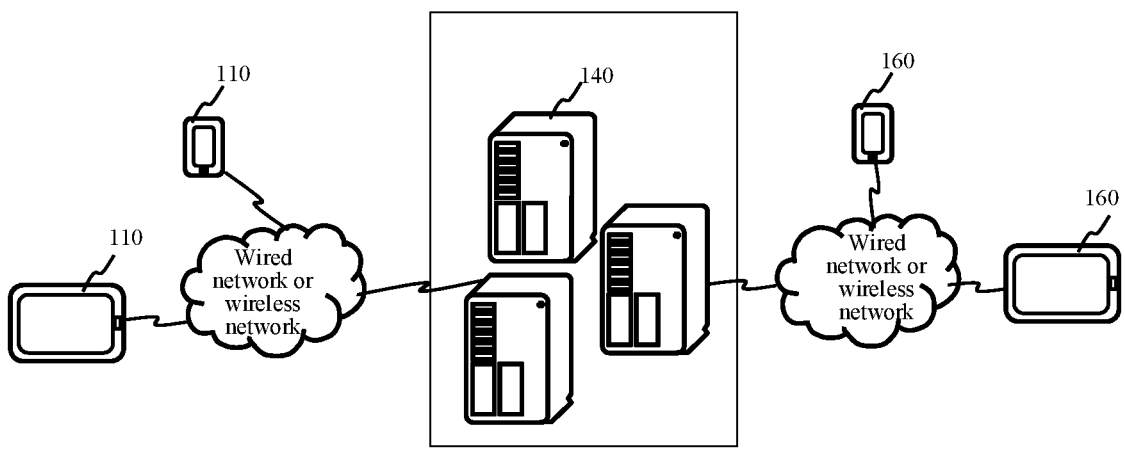
FIG. 1 is a schematic diagram of an implementation environment of a virtual prop control method according to an embodiment of this application.

To make the objectives, technical solutions, and advantages of this application clearer, the following further describes implementations of this application in detail with reference to the accompanying drawings. Evidently, the described embodiments are a part rather than all the embodiments of this application. All other embodiments obtained by a person of ordinary skill in the art based on the embodiments of this application without creative efforts shall fall within the protection scope of this application.

The terms "first", "second", and the like in this application are used for distinguishing between same items or similar items of which effects and functions are basically the same. It should be understood that the "first", "second", and "nth" do not have a dependency relationship in logic or time sequence, and a quantity and an execution order thereof are not limited.

For ease of understanding the technical processes in the embodiments of this application, some terms involved in the embodiments of this application are explained below.

Virtual scene: a virtual scene displayed (or provided) when an application program runs on a terminal. In some embodiments, the virtual scene is a simulated environment of a real world, or a semi-simulated semi-fictional virtual environment, or an entirely fictional virtual environment. The virtual scene is any one of a two-dimensional virtual scene, a 2.5-dimensional virtual scene, and a three-dimensional virtual scene. This is not limited in this application. For example, the virtual scene includes a sky, a land, an ocean, or the like. The land includes environmental elements such as a desert and a city. A user can control a virtual object to move in the virtual scene.

Virtual object: a movable object in a virtual scene. In some embodiments, the movable object is a virtual character, a virtual animal, a cartoon character or the like. In some embodiments, the virtual object is a virtual image used for representing the user in the virtual scene. In one implementation, the virtual scene includes a plurality of virtual objects, and each virtual object has a shape and a volume in the virtual scene, and occupies some space in the virtual scene. In some embodiments, the virtual object is a character controlled through an operation on a client, or is an artificial intelligence (AI) set in a virtual environment battle through training, or is a non-player character (NPC) set in the virtual scene battle. In some embodiments, the virtual object is a virtual character competing in a virtual scene. In some embodiments, a quantity of virtual objects in the virtual scene battle is preset, or is dynamically determined according to a quantity of clients participating in the battle. This is not limited in the embodiments of this application. In one implementation, the user can control the virtual object to move in the virtual scene, for example, control the virtual object to run, jump, crawl and the like, or can control the virtual object to use a skill, a virtual prop and the like provided by the application program to fight against another virtual object.

Shelter: a virtual object capable of blocking a bullet, a cannonball, etc. in a virtual scene. A fixed shelter, such as a wall, a stone or a box, is usually provided in the virtual scene. In an embodiment of this application, a virtual shelter prop capable of following a virtual object is provided in a virtual scene. The virtual shelter prop is exemplified in the form of a handheld shield.

Normal: a straight line with a direction in a three-dimensional virtual scene for determining the orientation of a face of a three-dimensional model.

FIG. 1 is a schematic diagram of an implementation environment of a virtual prop control method according to an embodiment of this application. Referring to FIG. 1, in a possible implementation, the implementation environment includes: a first terminal 110, a server 140, and a second terminal 160.

An application program supporting display of a virtual scene and a virtual object is installed and run on the first terminal 110. In some embodiments, the application program is any one of a virtual reality application program, a three-dimensional map program, a military simulation program, a role-playing game (RPG), a multiplayer online battle arena (MOBA) game, and a multiplayer gunfight survival game. The first terminal 110 is a terminal used by a first user, and the first user uses the first terminal 110 to operate a first virtual object in the virtual scene to perform a movement. The movement includes, but is not limited to: at least one of adjusting body postures, crawling, walking, running, riding, jumping, driving, picking, shooting, attacking, and throwing. For example, the first virtual object is a first virtual character, such as a simulated person role or a cartoon character role.

The first terminal 110 is connected to the server 140 by using a wireless network or a wired network.

In some embodiments, the server 140 is an independent physical server, or a server cluster or a distributed system formed by a plurality of physical servers, or a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The server 140 is configured to provide a backend service for the application program supporting display of the virtual scene and the virtual object. In some embodiments, the server 140 is responsible for primary computing work, and the first terminal 110 and the second terminal 160 are responsible for secondary computing work; or the server 140 is responsible for secondary computing work, and the first terminal 110 and the second terminal 160 are responsible for primary computing work; or the server 140, the first terminal 110 and the second terminal 160 perform collaborative computing by using a distributed computing architecture among each other.

An application program supporting display of a virtual scene and a virtual object is installed and run on the second terminal 160. In some embodiments, the application program is any one of a virtual reality application program, a three-dimensional map program, a military simulation program, a role-playing game (RPG), a multiplayer online battle arena (MOBA) game, and a multiplayer gunfight survival game. The second terminal 160 is a terminal used by a second user, and the second user uses the second terminal 160 to operate another virtual object in the virtual scene to perform a movement. The movement includes, but is not limited to: at least one of adjusting body postures, crawling, walking, running, riding, jumping, driving, picking, shooting, attacking, and throwing. For example, another virtual object is a second virtual character, such as a simulated character role or a cartoon character role.

The second terminal 160 is connected to the server 140 by using a wireless network or a wired network.

In some embodiments, the first virtual object controlled by the first terminal 110 and another virtual object controlled by the second terminal 160 are located in the same virtual scene, and in this case, the first virtual object can interact with another virtual object in the virtual scene. In some embodiments, the first virtual object and another virtual object is in an opposing relationship. For example, the first virtual object and another virtual object may belong to different virtual teams, and the virtual objects in the opposing relationship may attack each other by applying different skills, thereby performing battle manner interaction, and displaying performance effects triggered by the skills in the first terminal 110 and the second terminal 160.

In some other embodiments, the first virtual object and another virtual object is in a teammate relationship. For example, the first virtual object and another virtual object belong to the same virtual team, and have a friend relationship, or have a temporary communication permission.

In some embodiments, the application programs installed on the first terminal 110 and the second terminal 160 are the same, or the application programs installed on the two terminals are the same type of application programs on different operating system platforms. The first terminal 110 generally refers to one of a plurality of terminals, and the second terminal 160 generally refers to one of a plurality of terminals. In this embodiment, only the first terminal 110 and the second terminal 160 are used as an example for description. The device types of the first terminal 110 and the second terminal 160 are the same or different. The device types include: at least one of a smartphone, a tablet computer, a Moving Picture Experts Group Audio Layer III (MP3) player, a Moving Picture Experts Group Audio Layer IV (MP4) player, a laptop portable computer, and a desktop computer. For example, the first terminal 110 and the second terminal 160 are smartphones, or other handheld portable game devices. The following embodiment is described by using an example in which the terminal includes a smartphone.

A person skilled in the art may learn that there may be more or fewer terminals. For example, there may be only one terminal, or there may be dozens of or hundreds of terminals or more. The quantity and the device type of the terminals are not limited in this embodiment of this application.

The virtual prop control method provided by the embodiments of this application may be applied to various types of applications, such as shooting games and military simulation applications. In such applications, a virtual object may also avoid an attack in an open virtual scene such as desert and grassland by providing a movable virtual shelter prop. For example, a virtual object holds a virtual shelter prop to move in a virtual scene. The virtual shelter prop is capable of sheltering the virtual object so as to defend against the attack of other virtual objects, thereby improving the security of the virtual object in the virtual scene. Moreover, position adjustment through various movement operation instructions can be avoided, thereby avoiding generating redundant data processing procedures and reducing waste of resources. And the gaming experience of users is improved.

Figure 2:
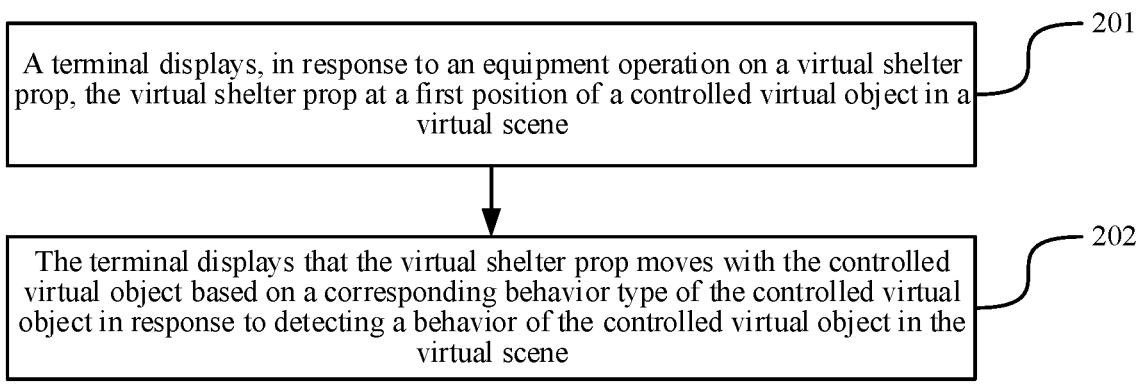
FIG. 2 is a flowchart of a virtual prop control method according to an embodiment of this application.

FIG. 2 is a flowchart of a virtual prop control method according to an embodiment of this application. The method may be applied to the above terminal or server. In an embodiment of this application, the virtual prop control method is introduced by taking the terminal as an executive body. Referring to FIG. 2, this embodiment may specifically include the following steps:

201: A terminal displays, in response to an equipment operation on a virtual shelter prop, the virtual shelter prop at a first position of a controlled virtual object in a virtual scene.

The terminal is a terminal used by any user, and the user controls the controlled virtual object to move in the virtual scene via the terminal. The virtual shelter prop is used for sheltering the controlled virtual object to defend against an attack. For example, the virtual shelter prop may defend against an attack by a virtual prop such as a bullet, a cannonball or a grenade. In some embodiments, the virtual shelter prop takes the form of a shield.

Figure 3:
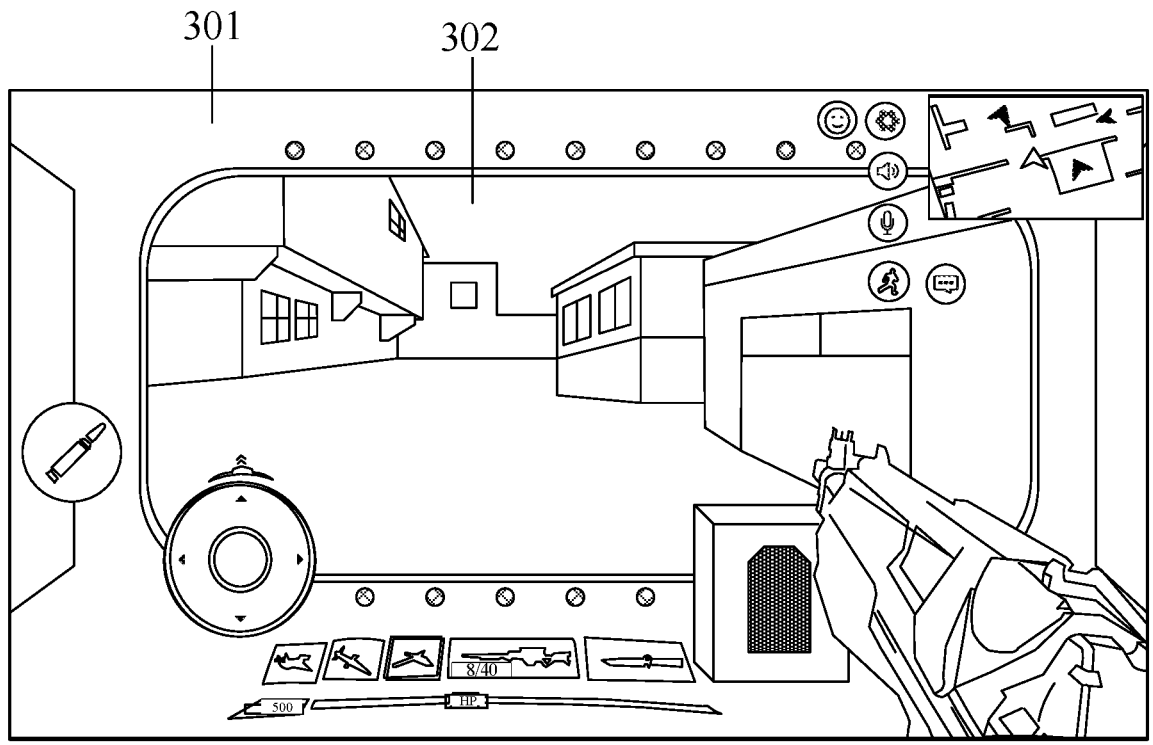
FIG. 3 is a schematic diagram of displaying a virtual shelter prop according to an embodiment of this application.
Figure 4:
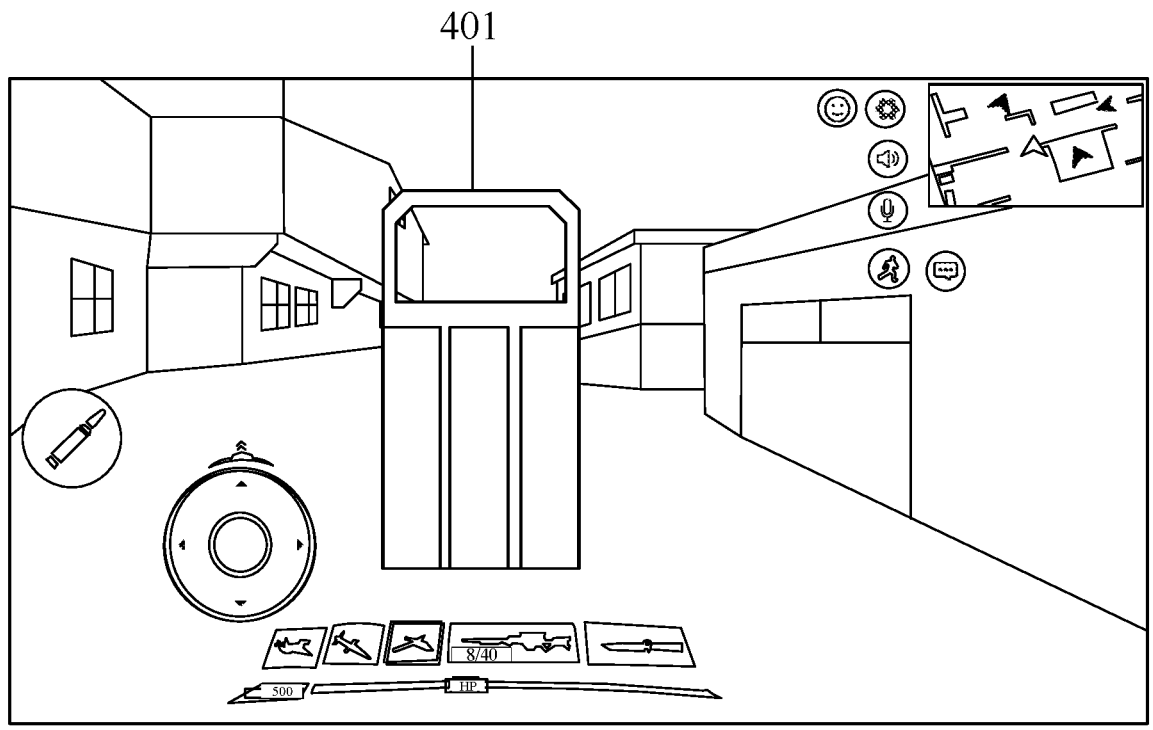
FIG. 4 is a schematic diagram of displaying a virtual shelter prop according to an embodiment of this application.

In one implementation, after a controlled virtual object is equipped with a virtual shelter prop, the terminal displays the virtual shelter prop at a first position of the controlled virtual object. In some embodiments, the first position is in front of the controlled virtual object, and the virtual shelter prop may defend the controlled virtual object against attacks in front. FIG. 3 is a schematic diagram of a virtual shelter prop moving with a controlled virtual object according to an embodiment of this application. FIG. 3 shows a display mode of a virtual shelter prop at a first-person perspective, i.e. a perspective of a controlled virtual object. As shown in FIG. 3, a virtual shelter prop 301 is displayed in front of the controlled virtual object. In some embodiments, the virtual shelter prop 301 is provided with an observation window 302. The controlled virtual object may observe a virtual scene in front through the observation window 302. FIG. 4 is a schematic diagram of a virtual shelter prop moving with a controlled virtual object according to an embodiment of this application. FIG. 4 shows a display mode of a virtual shelter prop at a third-person perspective. As shown in FIG. 4, a virtual shelter prop 401 is displayed in front of the controlled virtual object. It is to be noted that in an embodiment of this application, the description is given only with an example that the first position is in front of the controlled virtual object, and the embodiment of this application does not limit a specific display mode of the virtual shelter prop.

In an embodiment of this application, by providing a virtual shelter prop for defending against an attack, the type of virtual props in a game is richer and the functions thereof are more diversified, so as to improve the interest of the game. The mode of human-computer interaction in the game is also more flexible and diverse, whereby the degree of user retention can be improved.

202: The terminal displays that the virtual shelter prop moves with the controlled virtual object based on a corresponding behavior type of the controlled virtual object in response to detecting a behavior of the controlled virtual object in the virtual scene.

In an embodiment of this application, a user is able to control the activity of the controlled virtual object in the virtual scene, and the terminal determines a behavior of the controlled virtual object in the virtual scene in response to the user operation. The behavior of the controlled virtual object includes running, jumping, side sliding tackle, etc.

In an embodiment of this application, during the activity of the controlled virtual object in the virtual scene, the virtual shelter prop is capable of moving with the controlled virtual object based on the behavior of the controlled virtual object. In one implementation, the virtual shelter prop is a handheld virtual prop capable of moving with an arm of the controlled virtual object during the activity of the controlled virtual object. For example, when the controlled virtual object runs, the arm of the controlled virtual object presents a back-and-forth swing effect, and the virtual shelter prop swings with the swing of the arm of the controlled virtual object and moves with the movement of the controlled virtual object.

According to the technical solutions provided by the embodiments of this application, a controlled virtual object is sheltered by equipping the controlled virtual object with a movable virtual shelter prop, so as to avoid the controlled virtual object being directly exposed in a virtual scene and being attacked by other virtual objects. Moreover, the virtual shelter prop is capable of moving with the controlled virtual object. When the controlled virtual object runs, jumps, etc., the virtual shelter prop may also play a role in defending against an attack, thereby effectively improving the security of the controlled virtual object in competitive battles and improving the user experience.

Figure 5:
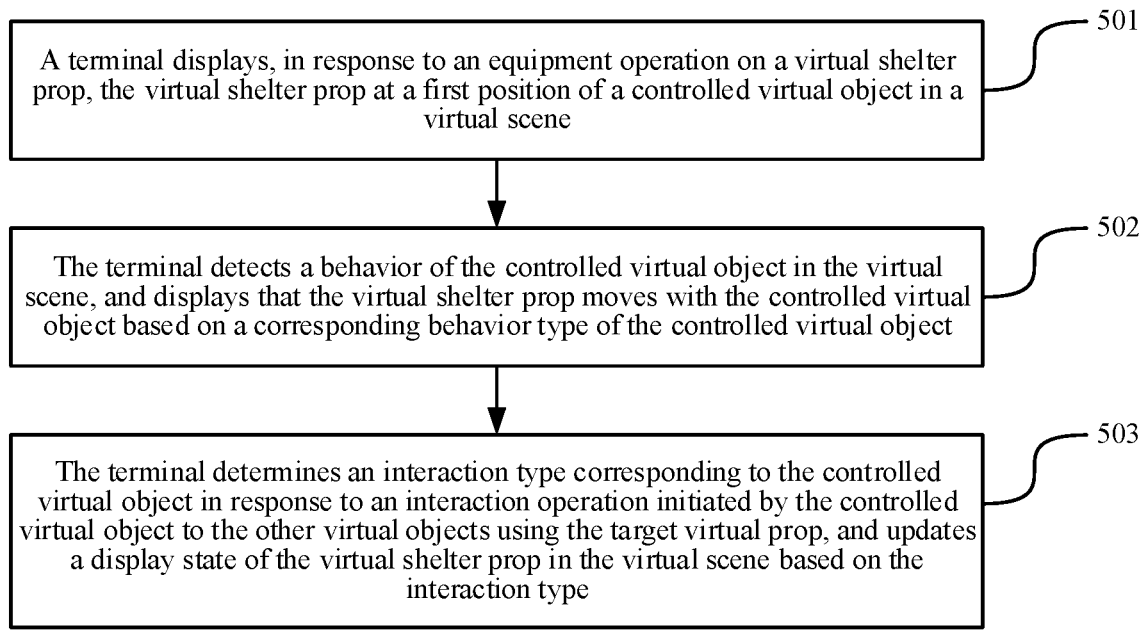
FIG. 5 is a flowchart of a virtual prop control method according to an embodiment of this application.

The virtual prop control method provided in this application is briefly described in the foregoing embodiment, and the method is described in specific below with reference to FIG. 5. FIG. 5 is a flowchart of a virtual prop control method according to an embodiment of this application. The method is applied to an implementation environment shown in FIG. 1. Referring to FIG. 5, in a possible implementation, this embodiment specifically includes the following steps:

501: A terminal displays, in response to an equipment operation on a virtual shelter prop, the virtual shelter prop at a first position of a controlled virtual object in a virtual scene.

In one implementation, the equipment operation of the terminal on the virtual shelter prop includes any one of the following implementations:

First implementation: The equipment operation is a pickup operation on the virtual shelter prop in the virtual scene. In one implementation, multiple virtual props are provided at different positions in a virtual scene, and a virtual object may pick up any one virtual prop in the virtual scene. In an embodiment of this application, in response to a pickup operation of a controlled virtual object on a virtual shelter prop in a virtual scene, a terminal determines that the controlled virtual object acquires the virtual shelter prop, and equips the controlled virtual object with the virtual shelter prop.

Figure 6:
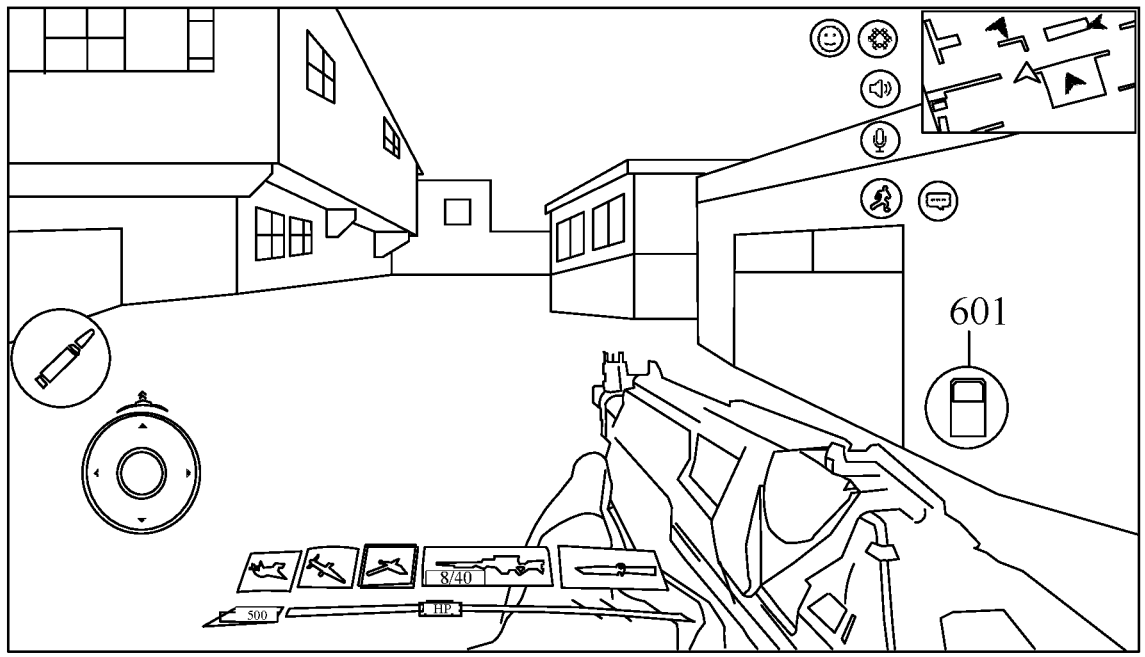
FIG. 6 is a schematic diagram of an operation interface according to an embodiment of this application.

Second implementation: The equipment operation is a trigger operation on a target equipment control. In one implementation, an operation interface displayed by the terminal is provided with a target equipment control for equipping the controlled virtual object with the virtual shelter prop. FIG. 6 is a schematic diagram of an operation interface according to an embodiment of this application. Referring to FIG. 6, the operation interface displays a target equipment control 601, and the controlled virtual object is equipped with the virtual shelter prop in response to a trigger operation of a user on the target equipment control 601. In some embodiments, after detecting the trigger operation of the user on the target equipment control, the terminal needs to firstly determine whether the controlled virtual object has acquired the controlled virtual prop. In response to the controlled virtual object having acquired the virtual shelter prop, the controlled virtual object is equipped with the virtual shelter prop. That is, the virtual shelter prop is displayed in the operation interface. In response to the controlled virtual object not acquiring the virtual shelter prop, first prompt information is displayed in the operation interface for a first user to acquire the virtual shelter prop firstly.

It is to be noted that the above description of the method for equipping with a virtual shelter prop is merely an exemplary description. In an embodiment of this application, a user may equip a controlled virtual object with a virtual shelter prop before a competitive battle is started. That is, the controlled virtual object has been equipped with the virtual shelter prop when the controlled virtual object carrying the virtual shelter prop enters a competitive battle, and the controlled virtual object may also be equipped with the virtual shelter prop after the competitive battle is started. This is not limited in the embodiments of this application. It is to be noted that the virtual shelter prop may also be disassembled from the virtual object during the competitive battle or the virtual shelter prop may be switched to another virtual prop. This is not limited in the embodiments of this application.

502: The terminal detects a behavior of the controlled virtual object in the virtual scene, and displays that the virtual shelter prop moves with the controlled virtual object based on a corresponding behavior type of the controlled virtual object.

In one implementation, the terminal determines a motion parameter based on a behavior type of the controlled virtual object, and the terminal controls the virtual shelter prop to move with the controlled virtual object based on the motion parameter. The motion parameter is used for indicating a movement path of the virtual shelter prop in the virtual scene. For example, the motion parameter includes normal information corresponding to the virtual shelter prop, etc. This is not limited in the embodiments of this application. Different behavior types correspond to different motion parameters. In some embodiments, the terminal stores a target configuration file for storing the motion parameter and other configuration information of the virtual shelter prop. In one implementation, the terminal acquires, based on a behavior type of the controlled virtual object, a motion parameter corresponding to the behavior type from the target configuration file, and determines a display position of the virtual shelter prop in each frame of picture based on the motion parameter, whereby the virtual shelter prop presents the effect of moving with the controlled virtual object.

Figure 7:
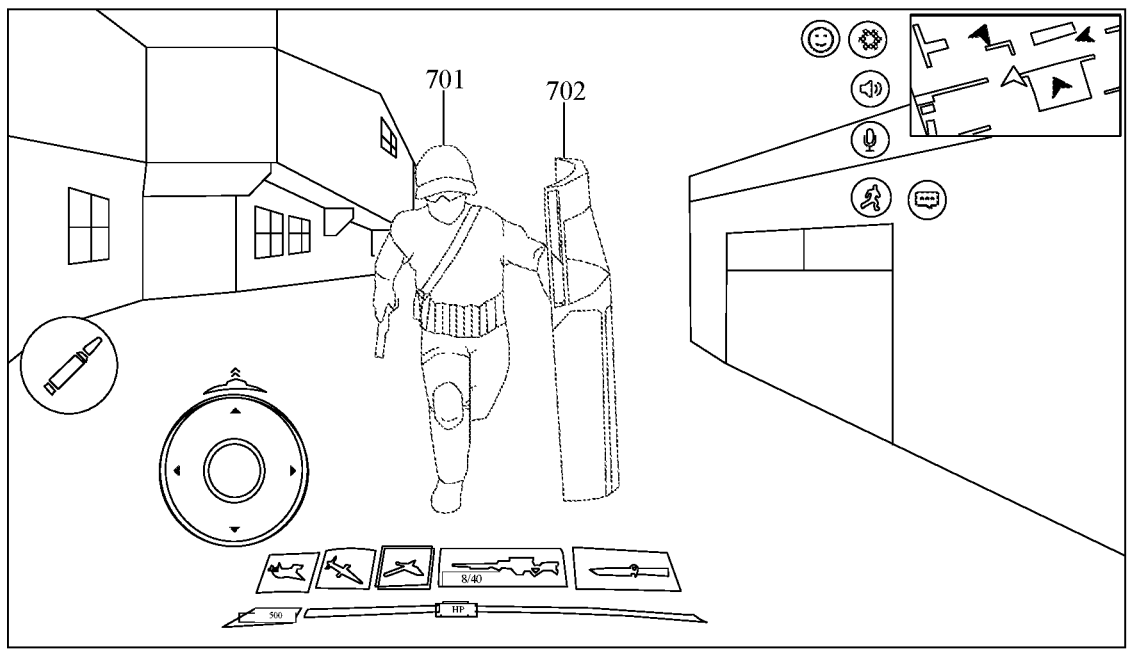
FIG. 7 is a schematic diagram of a virtual shelter prop moving with a controlled virtual object according to an embodiment of this application.
Figure 8:
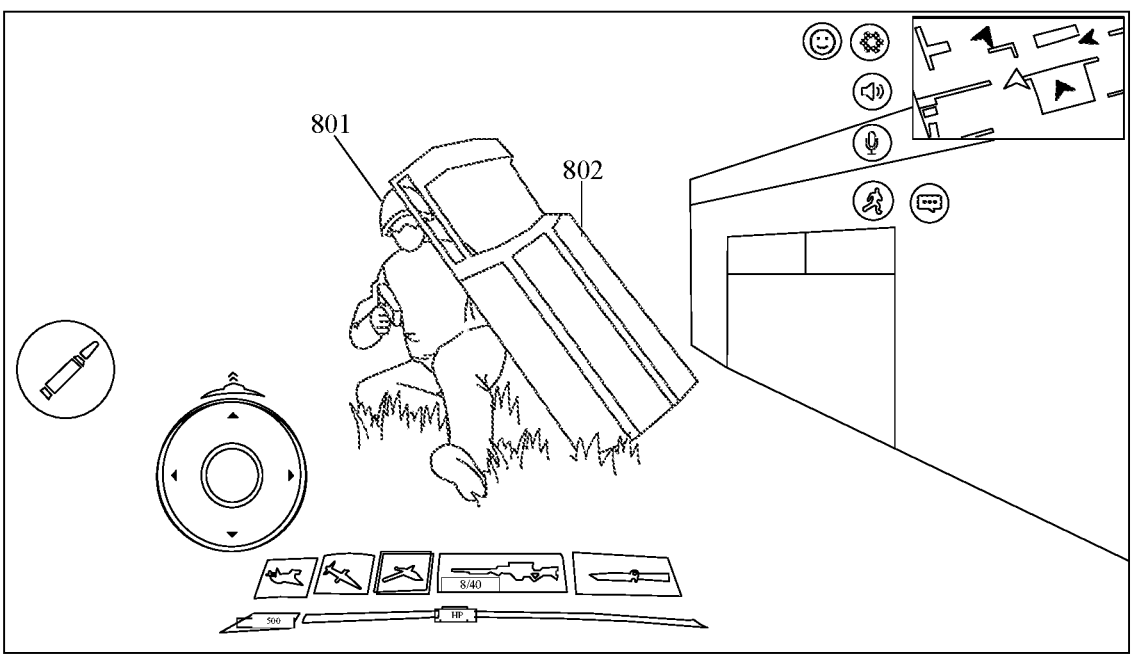
FIG. 8 is another schematic diagram of a virtual shelter prop moving with a controlled virtual object according to an embodiment of this application.

FIG. 7 is a schematic diagram of a virtual shelter prop moving with a controlled virtual object according to an embodiment of this application. In an example that a virtual shelter prop needs to be held by a controlled virtual object, as shown in FIG. 7, when a controlled virtual object 701 runs, a virtual shelter prop 702 is located at one side of the controlled virtual object 701 and swings with the shaking of an arm of the controlled virtual object 701. FIG. 8 is another schematic diagram of a virtual shelter prop moving with a controlled virtual object according to an embodiment of this application. As shown in FIG. 8, when a controlled virtual object 801 performs side sliding tackle, a virtual shelter prop 802 is displayed on one side of the controlled virtual object 801, and slides with the sliding of the controlled virtual object 801. As shown in FIGS. 7 and 8, in an embodiment of this application, the orientation and sheltering range of the virtual shelter prop will also change according to the activity of the controlled virtual object, which is consistent with actual operation conditions and can provide a better game experience for users.

In an embodiment of this application, when controlling a controlled virtual object to act in a virtual scene, a terminal needs to synchronize data of the controlled virtual object and a virtual shelter prop to a server. In one implementation, configuration information of the virtual object, the virtual shelter prop, etc. is also stored in the server. When data synchronization is performed between the terminal and the server, the terminal transmits a behavior type of the controlled virtual object to the server, and the server may update display state data of the virtual shelter prop in the virtual scene based on the behavior type and the configuration information of the virtual shelter prop. In this case, the terminal does not need to transmit the display state data of the virtual shelter prop in the virtual scene to the server in real time, thereby effectively reducing the amount of data transmission in the data synchronization process and improving the data transmission efficiency.

503: The terminal determines an interaction type corresponding to the controlled virtual object in response to an interaction initiated by the controlled virtual object to the other virtual objects using the target virtual prop, and updates a display state of the virtual shelter prop in the virtual scene based on the interaction type.

In one implementation, the controlled virtual object is equipped with a target virtual prop for launching an attack on the other virtual objects. For example, the target virtual prop is equipped with a sub-prop, and the controlled virtual object launches the sub-prop to attack the other virtual objects using the target virtual prop. Exemplarily, the target virtual prop is a virtual gun, and the target virtual prop is equipped with a virtual bullet.

Figure 9:
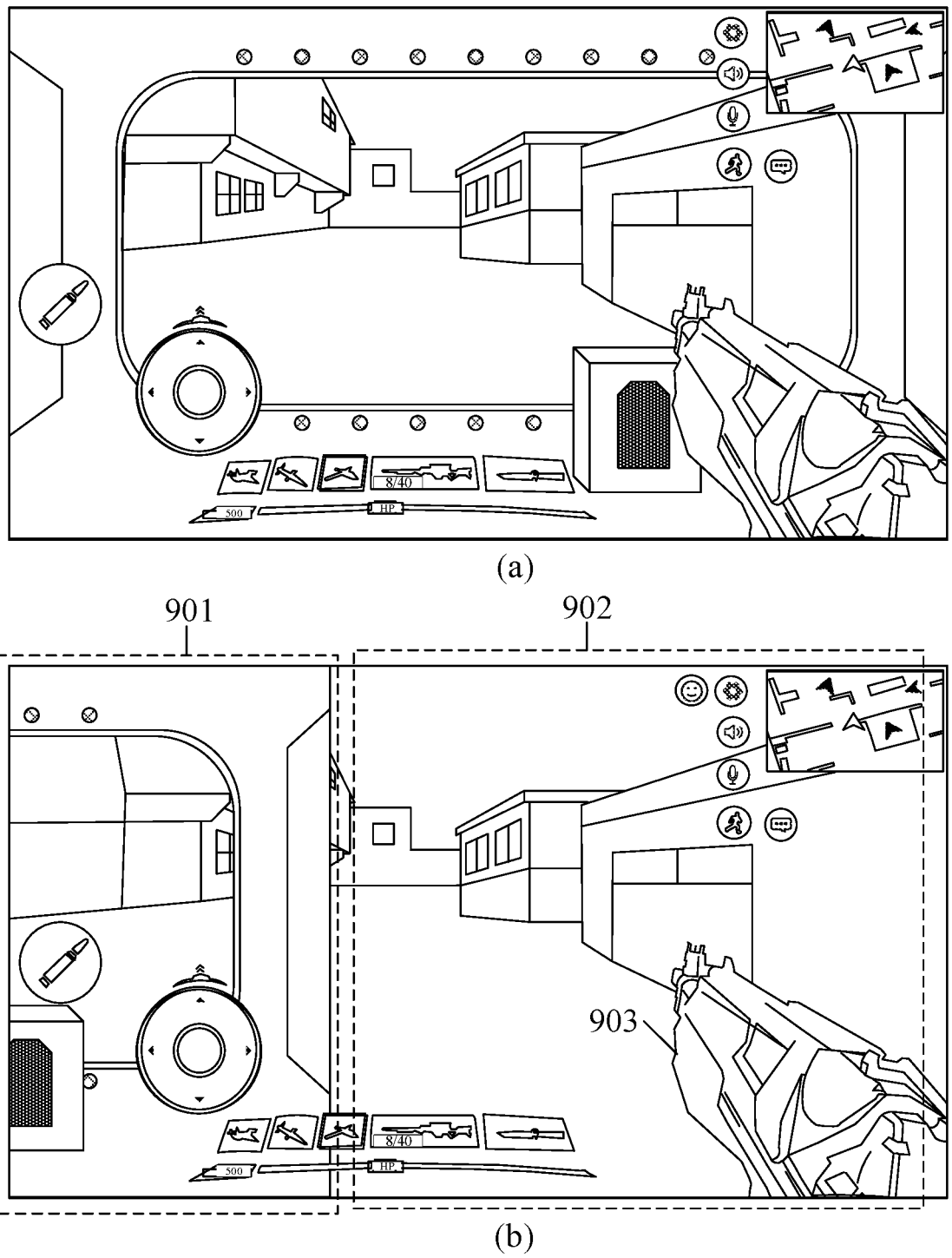
FIG. 9 is a schematic diagram of a display mode of a virtual shelter prop according to an embodiment of this application.

In an embodiment of this application, when the controlled virtual object initiates an interaction to other virtual objects, a display position of the virtual shelter prop is changed so as to avoid affecting an interaction behavior of the controlled virtual object. For example, when the controlled virtual object launches an attack on other virtual objects using the target virtual prop, the terminal is triggered to adjust the display position of the virtual shelter prop in the virtual scene so as to avoid sheltering the target virtual prop and affecting the attack effect of the target virtual prop. Exemplarily, the terminal moves the virtual shelter prop to a second position of the controlled virtual object for display in response to the interaction type being a first interaction type. The second position is set by a developer, and this is not limited in the embodiments of this application. The virtual shelter prop displayed at the second position does not shelter the target virtual prop. In an example that the controlled virtual object holds the virtual shelter prop with the left hand and holds the target virtual prop with the right hand and the target virtual prop is a virtual gun, when a user triggers the controlled virtual object to initiate an interaction using the target virtual prop, the terminal determines that the interaction type is a first interaction type. For example, the first interaction type is waist shooting. Then the terminal moves the virtual shelter prop from a first position, i.e. a position directly in front of the controlled virtual object, to a second position, i.e. a position in left front of the controlled virtual object, whereby the target virtual prop held by the controlled virtual object with the right hand, i.e. the virtual gun, is exposed outside a sheltered region of the virtual shelter prop. As shown in FIG. 9, FIG. 9 is a schematic diagram of a display mode of a virtual shelter prop according to an embodiment of this application. In an example of displaying at a first-person perspective, i.e. a perspective of the controlled virtual object, when a first interaction operation is not triggered, the display mode of the virtual shelter prop is as shown in FIG. 9(a). After the first interaction operation is triggered, the display mode of the virtual shelter prop is as shown in FIG. 9(b). The virtual shelter prop moves to the left front position of the controlled virtual object. That is, the virtual shelter prop is displayed in a region 901 of an operation interface, and a right region 902 of the operation interface is vacated, whereby the controlled virtual object launches an attack using a target virtual prop 903. In an embodiment of this application, the virtual shelter prop has different display states in the virtual scene for different interaction types. That is, the terminal may adjust the display position of the virtual shelter prop according to different interaction modes between virtual objects, and adjust a sheltered region of the virtual shelter prop in the virtual scene, so as to avoid affecting the interaction effect between the virtual objects.

Figure 10:
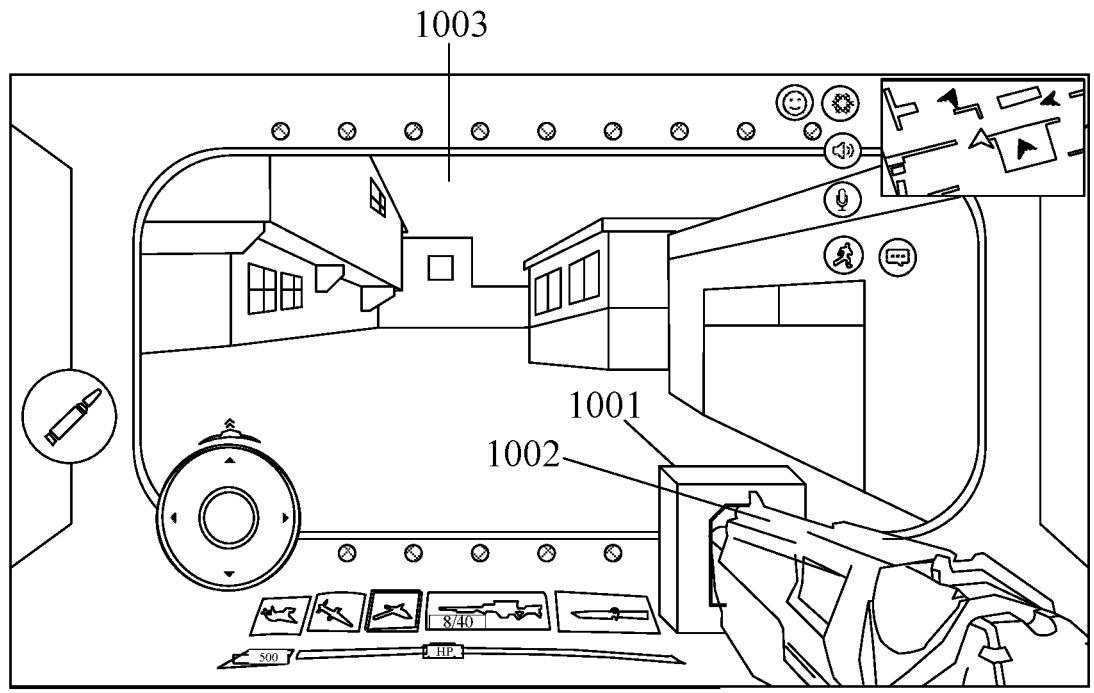
FIG. 10 is a schematic diagram of a display mode of a virtual shelter prop according to an embodiment of this application.
Figure 11:
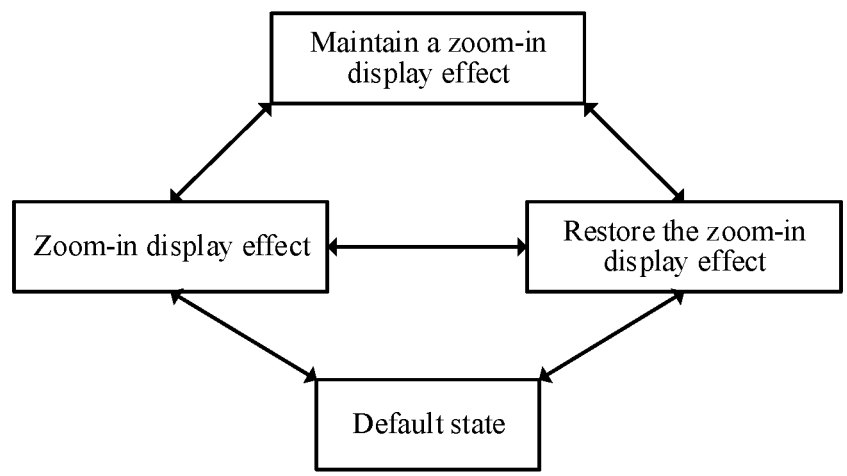
FIG. 11 is a schematic diagram of a display state switching mode of a virtual shelter prop according to an embodiment of this application.

In an embodiment of this application, the target virtual prop may also be erected on the virtual shelter prop, and the target virtual prop is fixed by the virtual shelter prop, whereby the controlled virtual object performs interaction using the target virtual prop. In an example that the target virtual prop is a virtual gun, when shooting based on a sighting telescope using the target virtual prop, i.e. when shooting with a sighting telescope, it is necessary for the controlled virtual object to hold the target virtual prop with both hands. In this case, since the controlled virtual object holds the virtual shelter prop with one hand, the target virtual prop cannot be held with both hands. In order to enable the controlled virtual object to shoot based on a sighting telescope using the target virtual prop in a case of being equipped with the virtual shelter prop, the target virtual prop needs to be erected on the virtual shelter prop so that the virtual shelter prop supports the target virtual prop. In one implementation, the terminal erects the target virtual prop at a reference position of the virtual shelter prop in response to the interaction type being a second interaction type. The reference position on the virtual shelter prop is set by a developer, and this is not limited in the embodiments of this application. In some embodiments, the second interaction type is shooting based on a sighting telescope using the target virtual prop, i.e. shooting with a sighting telescope. Exemplarily, the reference position of the virtual shelter prop is provided with a prop installation opening, and a target virtual prop may be erected on the prop installation opening. On the one hand, the prop installation opening may play a role in fixing the target virtual prop. On the other hand, one end of the target virtual prop for launching a sub-prop is aligned with the prop installation opening, whereby the end of the target virtual prop for launching a sub-prop is exposed outside the sheltered region of the virtual shelter prop, and the virtual shelter prop is avoided obstructing the target virtual prop from launching a sub-prop. In an example that the target virtual prop is a virtual gun, the virtual gun is erected on the virtual shelter prop in a scene of shooting with a sighting telescope, which is more consistent with actual operation situations, can provide a more reasonable and realistic operation experience for users, ensure that the controlled virtual object accurately hits a target in a case of holding a virtual shelter, and improve the game experience of users. FIG. 10 is a schematic diagram of a display mode of a virtual shelter prop according to an embodiment of this application. A reference position 1001 of the virtual shelter prop is provided with a prop installation opening, and a target virtual prop 1002 is erected on the prop installation opening. As shown in FIG. 10, the virtual shelter prop is provided with an observation window 1003. When shooting based on a sighting telescope with a target virtual prop, the controlled virtual object determines, based on a virtual scene displayed in the observation window, the positions of other virtual objects in the virtual scene, and controls, based on the positions of the other virtual objects in the virtual scene, the controlled virtual object to launch an attack on the other virtual objects using the target virtual prop. In one implementation, in response to the interaction type corresponding to the controlled virtual object being a second interaction type, the terminal may also zoom in and display the virtual shelter prop. That is, when the target virtual prop is erected on the virtual shelter prop, the virtual shelter prop is zoomed in and displayed in the operation interface, so as to present the effect that the virtual shelter prop is pulled and approaches the controlled virtual object, so that the behavior of the controlled virtual object in the virtual scene is more consistent with actual operation effects. FIG. 11 is a schematic diagram of a display state switching mode of a virtual shelter prop according to an embodiment of this application. As shown in FIG. 11, after a controlled virtual object is equipped with a virtual shelter prop, the virtual shelter prop is displayed as a default state in a virtual scene. When shooting with a sighting telescope, a zoom-in display effect of the virtual shelter prop is triggered. During the shooting with a sighting telescope, the virtual shelter prop maintains the zoom-in display effect. After the shooting with a sighting telescope is completed, the zoom-in display effect is restored, and the virtual shelter prop is displayed as a default state again. In an embodiment of this application, when zooming in and displaying the virtual shelter prop, the observation window on the virtual shelter prop will also be zoomed in. In this case, a user may see a larger range of virtual scene from the observation window, so that the user can obtain more information of the virtual scene, determine the positions of other virtual objects in the virtual scene more accurately, and obtain a better interaction experience.

It is to be noted that the above description of the mode of changing the display state of the virtual shelter prop during the virtual object interaction is merely an exemplary description of a possible implementation. In some embodiments, when the controlled virtual object interacts with other virtual objects, the virtual shelter prop may also be triggered to be disassembled from the terminal, so as to avoid affecting the interaction effect. This is not limited in the embodiments of this application.

In one implementation, the virtual shelter prop may also be used for interacting with other virtual objects. For example, in response to a distance between the controlled virtual object and the other virtual objects being smaller than or equal to a reference distance, the controlled virtual object is triggered to attack the other virtual objects using the virtual shelter prop. The reference distance is set by a developer, and this is not limited in the embodiments of this application. In one implementation, when the controlled virtual object hits other virtual objects using the virtual shelter prop, hit parts of the other virtual objects are firstly determined, and then interaction effect information is determined according to the hit parts. The interaction effect information may include life value change information of the other virtual objects that are hit, etc. The interaction effect information is transmitted to a server, and data verification and data synchronization are performed by the server. Other terminals participating in the current competitive battle. Interface display is performed based on the data synchronized by the server. For example, the effect of the other virtual objects that are hit, etc. are displayed. It is to be noted that the specific mode of the controlled virtual object attacking the other virtual objects using the virtual shelter prop is not limited in the embodiments of this application.

According to the technical solutions provided by the embodiments of this application, a controlled virtual object is sheltered by equipping the controlled virtual object with a movable virtual shelter prop, so as to avoid the controlled virtual object being directly exposed in a virtual scene and being attacked by other virtual objects. Moreover, the virtual shelter prop is capable of moving with the controlled virtual object. When the controlled virtual object runs, jumps, etc., the virtual shelter prop may also play a role in defending against an attack, thereby effectively improving the security of the controlled virtual object in competitive battles and improving the user experience.

Figure 12:
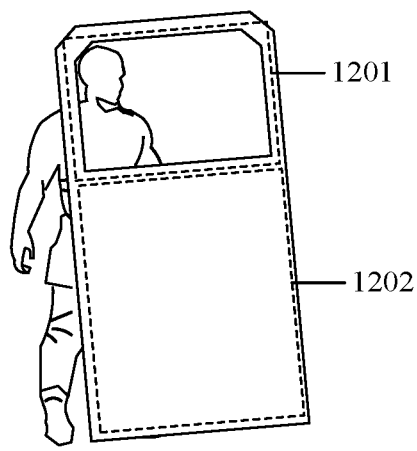
FIG. 12 is a schematic diagram of a setting mode of a collision detector according to an embodiment of this application.

The above embodiments mainly introduce the display mode of the virtual shelter prop in the virtual scene. In an embodiment of this application, both the virtual shelter prop and the virtual object may be damaged when being attacked. In an embodiment of this application, when a controlled virtual object is attacked by other virtual objects, it is necessary to firstly determine whether the other virtual objects hit the controlled virtual object or a virtual shelter prop held by the controlled virtual object. If the controlled virtual object is hit, the terminal updates a virtual life value corresponding to the controlled virtual object. If the virtual shelter prop is hit, the terminal determines damage information corresponding to the virtual shelter prop. In one implementation, the terminal determines a hit region on the virtual shelter prop in response to the virtual shelter prop of the controlled virtual object being hit. Specifically, in order to enable the virtual shelter prop to have a collision detection function, the virtual shelter prop is associated with a virtual body which is capable of moving synchronously with the virtual shelter prop, and at least one collision detector is provided on the virtual body. That is, the virtual shelter prop corresponds to at least one collision detector for detecting an attack on the virtual shelter prop. FIG. 12 is a schematic diagram of a setting mode of a collision detector according to an embodiment of this application. Referring to FIG. 12, different positions of a virtual shelter prop correspond to different collision detectors. For example, an observation window region 1201 corresponds to one collision detector, and a lower region 1202 of the observation window corresponds to one collision detector. In one implementation, after a controlled virtual object is equipped with the virtual shelter prop, in response to any one collision detector detecting that the virtual shelter prop is attacked, a reference region indicated on the virtual shelter prop by this collision detector is acquired, and the reference region is determined as the hit region. The terminal determines damage information of the virtual shelter prop based on the hit region on the virtual shelter prop, and plays a hit effect corresponding to the hit region in the virtual scene. Different hit regions on the virtual shelter prop correspond to different damage information and hit effects, and the hit effects include an audio effect and a visual effect. Exemplarily, when the observation window region on the virtual shelter prop is hit, the corresponding audio effect and visual effect are the effects when glass is hit. When other regions on the virtual shelter prop are hit, the corresponding audio effect and visual effect are the effects when a steel plate is hit. In an embodiment of this application, by providing multiple collision detectors for the virtual shelter prop, different hit parts of the virtual shelter prop are simulated to present different auditory-visual effects, so as to provide users with a game experience which is more consistent with an actual scene and improve the immersion in the interaction process.

In an embodiment of this application, a new virtual shelter prop and a new interaction mode are provided. The virtual shelter prop has a defensive function and an attack function. In a case of holding the virtual shelter prop with hands, the operation of waist shooting and shooting with a sighting telescope is also supported, so as to provide a new interaction experience for users.

Based on the display modes of the virtual object and the virtual prop described in the above embodiments, the display modes of the virtual object and the virtual prop are different at a first-person perspective and a third-person perspective. In conjunction with the above embodiments, the implementation principle of displaying the controlled virtual object and the virtual shelter prop in the virtual scene under different viewing angles is briefly described below. In an embodiment of this application, a partial region of the virtual shelter prop is displayed in an operation interface at the first-person perspective. For example, the display effect is as shown in FIG. 3, and the observation window of the virtual shelter prop is displayed in the operation interface. And at the first-person perspective, in order to enable a user to have a greater field of view and facilitate user operation, a complete controlled virtual object is not displayed in the operation interface. For example, only the hand of the controlled virtual object is displayed, or it is displayed that a certain virtual prop is held in the hand of the controlled virtual object. In this case, when displaying in the operation interface, only a hand image of the controlled virtual object needs to cover the handheld virtual prop, so that a smooth display effect can be achieved, and there is no need to separately create and render a model of the controlled virtual object. In one implementation, at a first-person perspective, the hands of a controlled virtual object are respectively managed with two weapon (virtual prop) data groups. For example, at the first-person perspective, a computer program for controlling a display state of the controlled virtual object includes a data group (b_LeftWeaponFirstPerson) corresponding to the left hand and a data group (b_RightWeaponFirstPerson) corresponding to the right hand. The left hand of the controlled virtual object holds a virtual shelter prop, and data corresponding to the virtual shelter prop is stored in the data group (b_LeftWeaponFirstPerson) corresponding to the left hand. The right hand holds a target virtual prop, and data corresponding to the target virtual prop is stored in the data group (b_RightWeaponFirstPerson) corresponding to the right hand.

However, when a complete controlled virtual object is displayed in an operation interface at a third-person perspective, a model of the controlled virtual object and a handheld virtual prop model of the controlled virtual object need to be rendered when displaying in the interface. The virtual prop model is bound with a hand skeleton of the model of the controlled virtual object, change information of the hand skeleton of the model of the controlled virtual object is acquired in real time, i.e. a motion parameter of the controlled virtual object is acquired, and the position, orientation, etc. of the virtual prop are updated according to the change information of the hand skeleton of the model of the controlled virtual object. For example, when the controlled virtual object performs side sliding tackle, the controlled virtual object tilts to one side, and the position of a left arm relative to the body changes. If the virtual shelter prop is bound with the left arm, the display state of the virtual shelter prop needs to be updated according to the movement of the left arm. For example, the display effect is as shown in FIG. 8, and the orientation of the virtual shelter prop is changed to the upper right. In one implementation, the hands of a controlled virtual object are respectively managed with two weapon attachment (virtual prop attachment) data groups. That is, at a third-person perspective, a computer program for controlling a display state of a controlled virtual object includes a data group corresponding to each body part of the controlled virtual object, and also includes two weapon attachment (virtual prop attachment) data groups. Since a complete controlled virtual object and virtual prop are displayed in a picture presented at the third-person perspective, two virtual prop models need to be respectively created and respectively associated with a b_LeftWeapon (left virtual prop node) data group and a b_RightWeapon (right virtual prop node) data group in a weapon attachment (virtual prop attachment). That is, data corresponding to the two virtual props are respectively associated with the b_LeftWeapon data group and the b_RightWeapon data group so as to respectively control the two virtual props. It is to be noted that the above description of an interface display effect implementation method is merely an exemplary description of a possible implementation, and how to implement the display of the virtual object and the virtual prop is not limited in the embodiments of this application.

All the foregoing technical solutions may be arbitrarily combined to form an embodiment of this application, and details are not described herein again.

Figure 13:
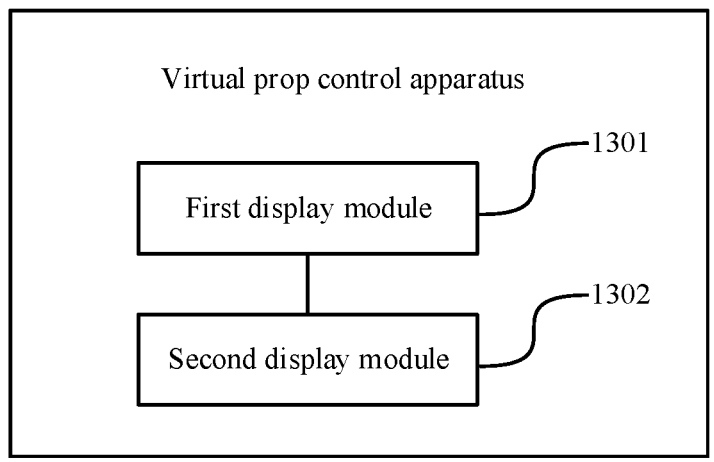
FIG. 13 is a schematic structural diagram of a virtual prop control apparatus according to an embodiment of this application.

FIG. 13 is a schematic structural diagram of a virtual prop control apparatus according to an embodiment of this application. Referring to FIG. 13, the apparatus includes:
- a first display module 1301, configured to display, in response to an equipment operation on a virtual shelter prop, the virtual shelter prop at a first position of a controlled virtual object in a virtual scene, the virtual shelter prop being used for sheltering the controlled virtual object to defend against an attack; and
- a second display module 1302, configured to display that the virtual shelter prop moves with the controlled virtual object based on a corresponding behavior type of the controlled virtual object in response to detecting a behavior of the controlled virtual object in the virtual scene.

In one implementation, the equipment operation on a virtual shelter prop includes any one of the following:
- a pickup operation on the virtual shelter prop in the virtual scene; and
- a trigger operation on a target equipment control for equipping the controlled virtual object with the virtual shelter prop.

In one implementation, the second display module 1302 is configured to:
- determine, based on a behavior type of the controlled virtual object, a motion parameter corresponding to the behavior type, the motion parameter being used for indicating a movement path of the virtual shelter prop in the virtual scene; and
- display that the virtual shelter prop moves with the controlled virtual object in the virtual scene based on the motion parameter.

In one implementation, the virtual shelter prop includes an observation window for displaying the virtual scene.

In one implementation, the controlled virtual object is equipped with a target virtual prop for launching an attack on the other virtual objects.

The apparatus further includes a type determining module for determining an interaction type corresponding to the controlled virtual object in response to the controlled virtual object applying an interaction initiated by the target virtual prop to the other virtual objects.

The apparatus further includes an update module for updating a display state of the virtual shelter prop in the virtual scene based on the interaction type.

In one implementation, the update module is configured to perform any one of the following:
- moving the virtual shelter prop to a second position of the controlled virtual object for display in response to the interaction type being a first interaction type, and displaying that the virtual shelter prop at the second position does not shelter the target virtual prop; and
- erecting the target virtual prop at a reference position of the virtual shelter prop in response to the interaction type being a second interaction type, and zooming in the virtual shelter prop.

In one implementation, the apparatus further includes:
- a region determining module, configured to determine a hit region on the virtual shelter prop in response to the virtual shelter prop of the controlled virtual object being hit, different hit regions on the virtual shelter prop corresponding to different damage information and hit effects, the hit effects including an audio effect and a visual effect;
- a damage determining module, configured to determine damage information of the virtual shelter prop based on the hit region on the virtual shelter prop; and
- a third display module, configured to display a hit effect corresponding to the hit region in the virtual scene.

In one implementation, the virtual shelter prop corresponds to at least one collision detector for detecting an attack on the virtual shelter prop.

The region determining module is configured to acquire, in response to any one collision detector detecting that the virtual shelter prop is attacked, a reference region indicated on the virtual shelter prop by this collision detector; and determine the reference region as the hit region.

In one implementation, the apparatus further includes:
- an attack triggering module, configured to trigger, in response to a distance between the controlled virtual object and other virtual objects being smaller than or equal to a reference distance, the controlled virtual object to attack the other virtual objects using the virtual shelter prop.

According to the apparatus provided by the embodiments of this application, a controlled virtual object is sheltered by equipping the controlled virtual object with a movable virtual shelter prop, so as to avoid the controlled virtual object being directly exposed in a virtual scene and being attacked by other virtual objects. Moreover, the virtual shelter prop is capable of moving with the controlled virtual object. When the controlled virtual object runs, jumps, etc., the virtual shelter prop may also play a role in defending against an attack, thereby effectively improving the security of the controlled virtual object in competitive battles and improving the user experience.

It is to be noted that when the virtual prop control apparatus provided by the foregoing embodiment is in the control of the virtual prop, only division of the foregoing function modules is used as an example for description. In a practical application, the functions may be allocated to and completed by different function modules according to requirements. That is, an internal structure of the apparatus is divided into different function modules, to complete all or some of the functions described above. In addition, the virtual prop control apparatus provided in the foregoing embodiment belongs to the same concept as the virtual prop control method embodiment. For a specific implementation process of the apparatus, refer to the method embodiment. Details are not described herein again.

Figure 14:
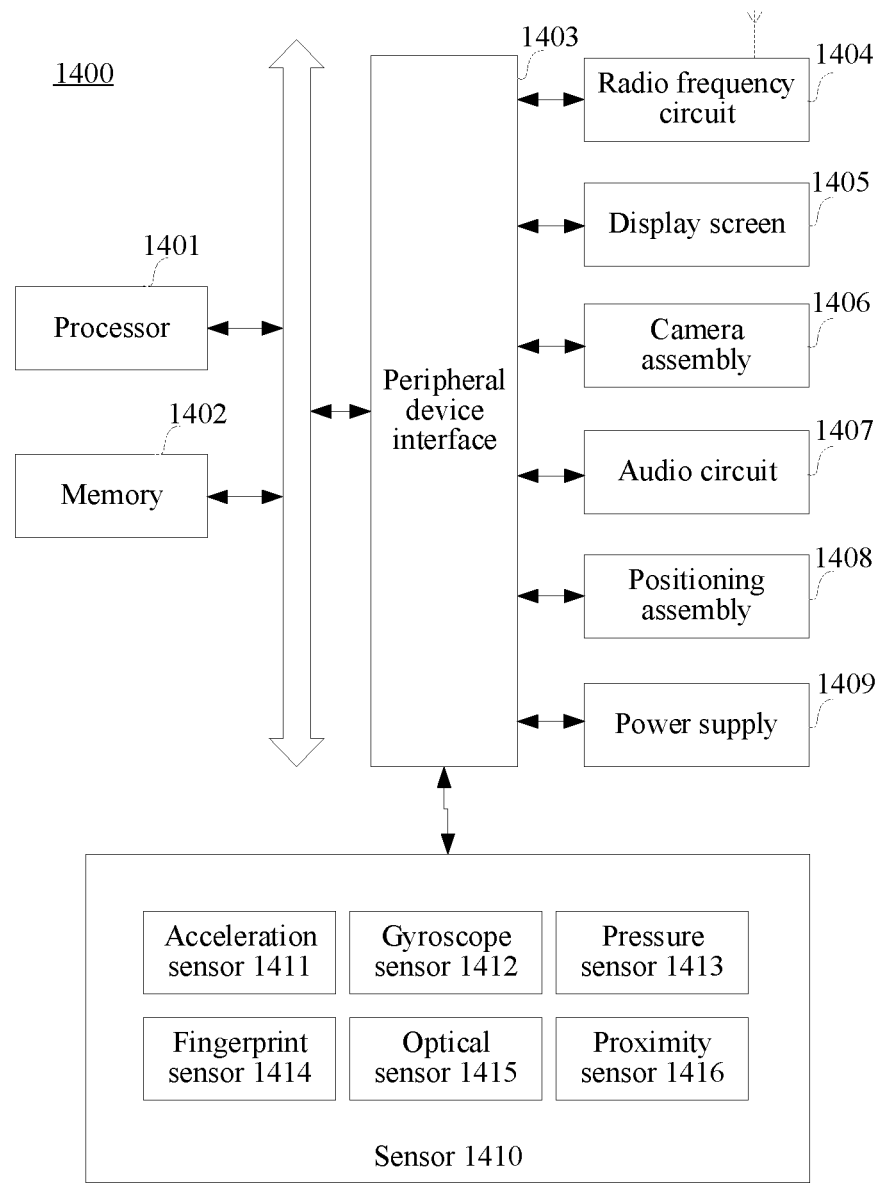
FIG. 14 is a schematic structural diagram of a terminal according to an embodiment of this application.

The computer device provided in the foregoing technical solutions may be implemented as a terminal or a server. For example, FIG. 14 is a schematic structural diagram of a terminal according to an embodiment of this application. The terminal 1400 may be: a smartphone, a tablet computer, a Moving Picture Experts Group Audio Layer III (MP3) player, a Moving Picture Experts Group Audio Layer IV (MP4) player, a notebook computer, or a desktop computer. The terminal 1400 may also be referred to as another name such as user equipment, a portable terminal, a laptop terminal, or a desktop terminal.

Generally, the terminal 1400 includes: one or more processors 1401 and one or more memories 1402.

The processor 1401 may include one or more processing cores, such as, a 4-core processor or an 8-core processor. The processor 1401 may be implemented by using at least one hardware form of a digital signal processor (DSP), a field-programmable gate array (FPGA), and a programmable logic array (PLA). The processor 1401 may alternatively include a main processor and a coprocessor. The main processor is a processor configured to process data in an active state, also referred to as a central processing unit (CPU). The coprocessor is a low-power processor configured to process data in a standby state. In some embodiments, the processor 1401 may be integrated with a graphics processing unit (GPU). The GPU is configured to render and draw content that needs to be displayed on a display. In some embodiments, the processor 1401 may further include an artificial intelligence (AI) processor. The AI processor is configured to process computing operations related to machine learning.

The memory 1402 may include one or more computer-readable storage media that may be non-transitory. The memory 1402 may further include a high-speed random access memory (RAM), and a non-volatile memory such as one or more magnetic disk storage devices or flash storage devices. In some embodiments, a non-transient non-transitory computer-readable storage medium in the memory 1402 is configured to store at least one program code, and the at least one program code is configured to be executed by the processor 1401 to implement the virtual prop control method provided in the method embodiments of this application.

In some embodiments, the terminal 1400 may also include: a peripheral device interface 1403 and at least one peripheral device. The processor 1401, the memory 1402, and the peripheral device interface 1403 may be connected through a bus or a signal cable. Each peripheral device may be connected to the peripheral device interface 1403 through the bus, the signal cable, or a circuit board. Specifically, the peripheral device includes: at least one of a radio frequency circuit 1404, a display screen 1405, a camera assembly 1406, an audio circuit 1407, a positioning assembly 1408, and a power supply 1409.

The peripheral device interface 1403 may be configured to connect at least one peripheral device related to input/output (I/O) to the processor 1401 and the memory 1402. In some embodiments, the processor 1401, the memory 1402, and the peripheral device interface 1403 are integrated on the same chip or the same circuit board. In some other embodiments, any or both of the processor 1401, the memory 1402, and the peripheral device interface 1403 may be implemented on an independent chip or circuit board. This is not limited in this embodiment.

The radio frequency circuit 1404 is configured to receive and transmit a radio frequency (RF) signal, which is also referred to as an electromagnetic signal. The radio frequency circuit 1404 communicates with a communication network and other communication devices through the electromagnetic signal. The radio frequency circuit 1404 converts an electrical signal into an electromagnetic signal for transmission, or converts a received electromagnetic signal into an electrical signal. In some embodiments, the radio frequency circuit 1404 includes: an antenna system, an RF transceiver, one or more amplifiers, a tuner, an oscillator, a digital signal processor, a codec chipset, a user identity module card, and the like. The radio frequency circuit 1404 may communicate with another terminal by using at least one wireless communication protocol. The wireless communication protocol includes but is not limited to a metropolitan area network, various generations of mobile communication networks (2G, 3G, 4G, and 5G), a wireless local area network, and/or a wireless fidelity (WiFi) network. In some embodiments, the RF 1404 may further include a circuit related to NFC, which is not limited in this application.

The display screen 1405 is configured to display a user interface (UI). The UI may include a graphic, text, an icon, a video, and any combination thereof. When the display screen 1405 is a touch display screen, the display screen 1405 also has a capability to collect a touch signal on or above a surface of the display screen 1405. The touch signal may be inputted, as a control signal, to the processor 1401 for processing. In this case, the display screen 1405 may be further configured to provide a virtual button and/or a virtual keyboard, which is also referred to as a soft button and/or a soft keyboard. In some embodiments, there may be one display screen 1405 disposed on a front panel of the terminal 1400. In other embodiments, there may be at least two display screens 1405 that are respectively disposed on different surfaces of the terminal 1400 or folded. In some embodiments, the display screen 1405 may be a flexible display screen, disposed on a curved surface or a folded surface of the terminal 1400. Even, the display screen 1405 may be further set in a non-rectangular irregular graph, that is, namely, a special-shaped screen. The display screen 1405 may be prepared by using materials such as a liquid crystal display (LCD), an organic light-emitting diode (OLED), or the like.

The camera component 1406 is configured to collect an image or a video. In some embodiments, the camera component 1406 includes a front-facing camera and a rear-facing camera. Generally, the front-facing camera is disposed on a front panel of the terminal, and the rear-facing camera is disposed on a rear surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera assembly 1406 may further include a flashlight. The flash may be a monochrome temperature flash, or may be a double color temperature flash. The double color temperature flash refers to a combination of a warm light flash and a cold light flash, and may be used for light compensation under different color temperatures.

The audio circuit 1407 may include a microphone and a speaker. The microphone is configured to collect sound waves of users and surroundings, and convert the sound waves into electrical signals and input the signals to the processor 1401 for processing, or input the signals to the RF circuit 1404 to implement voice communication. For a purpose of stereo acquisition or noise reduction, there may be a plurality of microphones disposed at different portions of the terminal 1400. The microphone may be further an array microphone or an omnidirectional microphone. The speaker is configured to convert electric signals from the processor 1401 or the RF circuit 1404 into sound waves. The speaker may be a conventional thin-film speaker or a piezoelectric ceramic speaker. When the speaker is the piezoelectric ceramic speaker, electric signals not only may be converted into sound waves that can be heard by human, but also may be converted into sound waves that cannot be heard by human for ranging and the like. In some embodiments, the audio circuit 1407 may further include a headphone jack.

The positioning component 1408 is configured to determine a current geographic location of the terminal 1400, to implement a navigation or a location based service (LBS). The positioning component 1408 may be a positioning component based on the global positioning system (GPS) of the United States, the BeiDou Navigation Satellite System (BDS) of China, the GLONASS System of Russia, or the GALILEO System of the European Union.

The power supply 1409 is configured to supply power to components in the terminal 1400. The power supply 1409 may be an alternating current, a direct current, a primary battery, or a rechargeable battery. When the power supply 1409 includes a rechargeable battery, the rechargeable battery may be a wired rechargeable battery or a wireless rechargeable battery. The rechargeable battery may be further configured to support a fast charge technology.

In some embodiments, the terminal 1400 further includes one or more sensors 1410. The one or more sensors 1410 include but are not limited to an acceleration sensor 1411, a gyro sensor 1412, a pressure sensor 1413, a fingerprint sensor 1414, an optical sensor 1415, and a proximity sensor 1416.

The acceleration sensor 1411 may detect a magnitude of acceleration on three coordinate axes of a coordinate system established with the terminal 1400. For example, the acceleration sensor 1411 may be configured to detect components of gravity acceleration on the three coordinate axes. The processor 1401 may control, according to a gravity acceleration signal collected by the acceleration sensor 1411, the display screen 1405 to display the UI in a frame view or a portrait view. The acceleration sensor 1411 may be further configured to collect data of a game or a user movement.

The gyroscope sensor 1412 may detect a body direction and a rotation angle of the terminal 1400, and the gyroscope sensor 1412 may work with the acceleration sensor 1411 to collect a 3D action performed by the user on the terminal 1400. The processor 1401 may implement the following functions according to the data collected by the gyro sensor 1412: motion sensing (for example, change of the UI based on a tilt operation of the user), image stabilization during photographing, game control, and inertial navigation.

The pressure sensor 1413 may be disposed on a side frame of the terminal 1400 and/or a lower layer of the display screen 1405. When the pressure sensor 1413 is disposed at the side frame of the terminal 1400, a holding signal of the user on the terminal 1400 may be detected, and the processor 1401 performs left/right hand recognition or a quick operation according to the holding signal collected by the pressure sensor 1413. When the pressure sensor 1413 is disposed on the low layer of the display screen 1405, the processor 1401 controls, according to a pressure operation of the user on the display screen 1405, an operable control on the UI. The operable control includes at least one of a button control, a scroll-bar control, an icon control, and a menu control.

The fingerprint sensor 1414 is configured to collect a fingerprint of a user, and the processor 1401 recognizes an identity of the user according to the fingerprint collected by the fingerprint sensor 1414, or the fingerprint sensor 1414 recognizes the identity of the user based on the collected fingerprint. When identifying that the user's identity is a trusted identity, the processor 1401 authorizes the user to perform related sensitive operations. The sensitive operations include: unlocking a screen, viewing encrypted information, downloading software, paying, changing a setting, and the like. The fingerprint sensor 1414 may be disposed on a front surface, a back surface, or a side surface of the terminal 1400. When a physical button or a vendor logo is disposed on the terminal 1400, the fingerprint 1414 may be integrated with the physical button or the vendor logo.

The optical sensor 1415 is configured to collect ambient light intensity. In an embodiment, the processor 1401 may control display luminance of the display screen 1405 according to the ambient light intensity collected by the optical sensor 1415. Specifically, when the ambient light intensity is relatively high, the display luminance of the display screen 1405 is increased; and when the ambient light intensity is relatively low, the display luminance of the display screen 1405 is reduced. In another embodiment, the processor 1401 may further dynamically adjust a photographing parameter of the camera component 1406 according to the ambient light intensity collected by the optical sensor 1415.

The proximity sensor 1416, also referred to as a distance sensor, is generally disposed on the front panel of the terminal 1400. The proximity sensor 1416 is configured to collect a distance between the user and the front surface of the terminal 1400. In an embodiment, when the proximity sensor 1416 detects that the distance between the user and the front surface of the terminal 1400 gradually becomes small, the display screen 1405 is controlled by the processor 1401 to switch from a screen-on state to a screen-off state When the proximity sensor 1416 detects that the distance between the user and the front surface of the terminal 1400 gradually increases, the display screen 1405 is controlled by the processor 1401 to switch from the screen-off state to the screen-on state.

A person skilled in the art may understand that the structure shown in FIG. 14 constitutes no limitation on the terminal 1400, and the terminal may include more or fewer components than those shown in the figure, or some components may be combined, or a different component deployment may be used.

Figure 15:
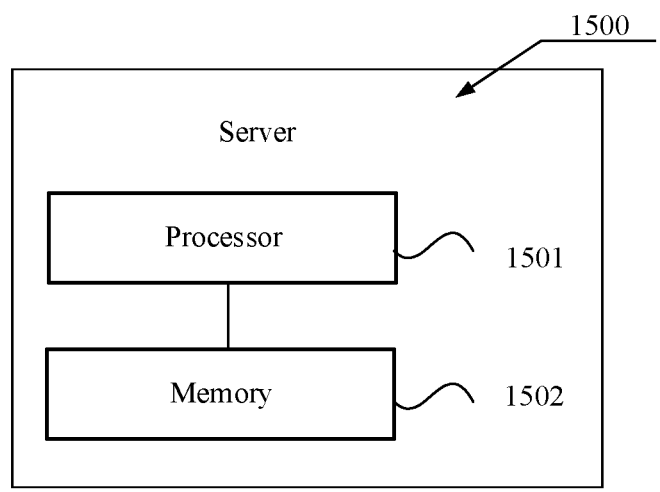
FIG. 15 is a schematic structural diagram of a server according to an embodiment of this application.

FIG. 15 is a schematic structural diagram of a server according to an embodiment of this application. The server 1500 may vary greatly because a configuration or performance varies, and may include one or more central processing units (CPU) 1501 and one or more memories 1502. The one or more memories 1502 store at least one program code, and the at least one program code is loaded and executed by the one or more processors 1501 to implement the methods provided in the foregoing various method embodiments. Certainly, the server 1500 may also have a wired or wireless network interface, a keyboard, an input/output interface and other components to facilitate input/output. The server 1500 may also include other components for implementing device functions. Details are not described herein again.

In an exemplary embodiment, a non-transitory computer-readable storage medium, for example, a memory including at least one program code is further provided. The at least one program code may be executed by a processor to implement the virtual prop control method in the foregoing embodiments. For example, the computer-readable storage medium may be read-only memory (ROM), a random access memory (RAM), a compact disc ROM (CD-ROM), a magnetic tape, a floppy disk, an optical data storage device, or the like.

In an exemplary embodiment, a computer program product is provided. The computer program product includes a computer program, and the computer program is stored in a computer-readable storage medium. A processor of a computer device reads the computer program from the computer-readable storage medium, and the processor executes the computer program, to cause the computer device to implement operations performed in the virtual prop control method.

Persons of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a read-only memory, a magnetic disk, an optical disc, or the like.

The foregoing descriptions are merely embodiments of this application, but are not intended to limit this application. Any modification, equivalent replacement, or improvement made without departing from the spirit and principle of this application is to fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A virtual prop control method performed by a computer device, the method comprising:
   displaying, in response to an equipment operation on a virtual shelter prop, the virtual shelter prop at a first position of a controlled virtual object in a virtual scene, the virtual shelter prop being used for sheltering the first position of the controlled virtual object;
   detecting a behavior of the controlled virtual object in the virtual scene;
   in response to the detected behavior:
      displaying a movement of the controlled virtual object corresponding to the detected behavior in the virtual scene;
      determining a corresponding behavior type of the controlled virtual object;
      determining, based on the behavior type of the controlled virtual object, a motion parameter corresponding to the behavior type, the motion parameter indicating a movement path of the virtual shelter prop in the virtual scene;
      displaying a movement of the virtual shelter prop along the movement path in the virtual scene according to the motion parameter and the movement of the controlled virtual object in the virtual scene; and
      displaying, at the end of the movement of the virtual shelter prop, the virtual shelter prop at a second position of the controlled virtual object in the virtual scene, the virtual shelter prop being used for sheltering the second position of the controlled virtual object and the second position of the controlled virtual object being different from the first position of the controlled virtual object.

2. The method according to claim 1, wherein the equipment operation on a virtual shelter prop comprises any one of the following:
   a pickup operation on the virtual shelter prop in the virtual scene; and
   a trigger operation on a target equipment control for controlling the controlled virtual object to perform an equipment operation on a virtual shelter prop.

3. The method according to claim 1, wherein the virtual shelter prop comprises an observation window for displaying an observable partial virtual scene.

4. The method according to claim 1, wherein the controlled virtual object is equipped with a target virtual prop for launching an attack on other virtual objects;
   after the displaying, in response to an equipment operation on a virtual shelter prop, the virtual shelter prop at a first position of a controlled virtual object in a virtual scene, the method further comprises:
   determining an interaction type corresponding to the controlled virtual object in response to an interaction operation initiated by the controlled virtual object to the other virtual objects using the target virtual prop; and
   updating a display state of the virtual shelter prop in the virtual scene based on the interaction type.

5. The method according to claim 4, wherein the updating a display state of the virtual shelter prop in the virtual scene based on the interaction type comprises any one of the following:
   moving the virtual shelter prop from the first position to the second position of the controlled virtual object for display in response to the interaction type being a first interaction type, and displaying that the virtual shelter prop at the second position does not shelter the target virtual prop; and
   erecting the target virtual prop at a reference position of the virtual shelter prop in response to the interaction type being a second interaction type, and zooming in and displaying the virtual shelter prop.

6. The method according to claim 1, wherein the method further comprises:
   determining a hit region on the virtual shelter prop in response to an operation of hitting the virtual shelter prop of the controlled virtual object, different hit regions on the virtual shelter prop corresponding to different damage information and hit effects, the hit effects comprising an audio effect and a visual effect;
   determining damage information of the virtual shelter prop based on the hit region on the virtual shelter prop; and
   displaying a hit effect corresponding to the hit region in the virtual scene.

7. The method according to claim 1, wherein the method further comprises:
   triggering, in response to a distance between the controlled virtual object and other virtual objects being smaller than or equal to a reference distance, the controlled virtual object to attack the other virtual objects using the virtual shelter prop.

8. A computer device, comprising one or more processors and one or more memories, the one or more memories storing at least one computer program, the at least one computer program being loaded and executed by the one or more processors to cause the computer device to implement a virtual prop control method comprising:

displaying, in response to an equipment operation on a virtual shelter prop, the virtual shelter prop at a first position of a controlled virtual object in a virtual scene, the virtual shelter prop being used for sheltering the first position of the controlled virtual object;

detecting a behavior of the controlled virtual object in the virtual scene;

in response to the detected behavior:
displaying a movement of the controlled virtual object corresponding to the detected behavior in the virtual scene;

determining a corresponding behavior type of the controlled virtual object; and determining, based on the behavior type of the controlled virtual object, a motion parameter corresponding to the behavior type, the motion parameter indicating a movement path of the virtual shelter prop in the virtual scene;

displaying a movement of the virtual shelter prop along the movement path in the virtual scene according to the motion parameter and the movement of the controlled virtual object in the virtual scene; and displaying, at the end of the movement of the virtual shelter prop, the virtual shelter prop at a second position of the controlled virtual object in the virtual scene, the virtual shelter prop being used for sheltering the second position of the controlled virtual object and the second position of the controlled virtual object being different from the first position of the controlled virtual object.

9. The computer device according to claim 8, wherein the equipment operation on a virtual shelter prop comprises any one of the following:

a pickup operation on the virtual shelter prop in the virtual scene; and a trigger operation on a target equipment control for controlling the controlled virtual object to perform an equipment operation on a virtual shelter prop.

10. The computer device according to claim 8, wherein the virtual shelter prop comprises an observation window for displaying an observable partial virtual scene.

11. The computer device according to claim 8, wherein the controlled virtual object is equipped with a target virtual prop for launching an attack on other virtual objects;

after the displaying, in response to an equipment operation on a virtual shelter prop, the virtual shelter prop at a first position of a controlled virtual object in a virtual scene, the method further comprises:

determining an interaction type corresponding to the controlled virtual object in response to an interaction operation initiated by the controlled virtual object to the other virtual objects using the target virtual prop; and updating a display state of the virtual shelter prop in the virtual scene based on the interaction type.

12. The computer device according to claim 11, wherein the updating a display state of the virtual shelter prop in the virtual scene based on the interaction type comprises any one of the following:

moving the virtual shelter prop from the first position to the second position of the controlled virtual object for display in response to the interaction type being a first interaction type, and displaying that the virtual shelter prop at the second position does not shelter the target virtual prop; and erecting the target virtual prop at a reference position of the virtual shelter prop in response to the interaction type being a second interaction type, and zooming in and displaying the virtual shelter prop.

13. The computer device according to claim 8, wherein the method further comprises:

determining a hit region on the virtual shelter prop in response to an operation of hitting the virtual shelter prop of the controlled virtual object, different hit regions on the virtual shelter prop corresponding to different damage information and hit effects, the hit effects comprising an audio effect and a visual effect;

determining damage information of the virtual shelter prop based on the hit region on the virtual shelter prop; and displaying a hit effect corresponding to the hit region in the virtual scene.

14. The computer device according to claim 8, wherein the method further comprises:

triggering, in response to a distance between the controlled virtual object and other virtual objects being smaller than or equal to a reference distance, the controlled virtual object to attack the other virtual objects using the virtual shelter prop.

15. A non-transitory computer-readable storage medium, storing at least one computer program, the at least one computer program being loaded and executed by a processor of a computer device to cause the computer device to implement a virtual prop control method comprising:

displaying, in response to an equipment operation on a virtual shelter prop, the virtual shelter prop at a first position of a controlled virtual object in a virtual scene, the virtual shelter prop being used for sheltering the first position of the controlled virtual object;

detecting a behavior of the controlled virtual object in the virtual scene;

in response to the detected behavior:
displaying a movement of the controlled virtual object corresponding to the detected behavior in the virtual scene;

determining a corresponding behavior type of the controlled virtual object; and determining, based on the behavior type of the controlled virtual object, a motion parameter corresponding to the behavior type, the motion parameter indicating a movement path of the virtual shelter prop in the virtual scene;

displaying a movement of the virtual shelter prop along the movement path in the virtual scene according to the motion parameter and the movement of the controlled virtual object in the virtual scene; and displaying, at the end of the movement of the virtual shelter prop, the virtual shelter prop at a second position of the controlled virtual object in the virtual scene, the virtual shelter prop being used for sheltering the second position of the controlled virtual object and the second position of the controlled virtual object being different from the first position of the controlled virtual object.

16. The non-transitory computer-readable storage medium according to claim 15, wherein the controlled virtual object is equipped with a target virtual prop for launching an attack on other virtual objects;

after the displaying, in response to an equipment operation on a virtual shelter prop, the virtual shelter prop at a first position of a controlled virtual object in a virtual scene, the method further comprises:

determining an interaction type corresponding to the controlled virtual object in response to an interaction operation initiated by the controlled virtual object to the other virtual objects using the target virtual prop; and updating a display state of the virtual shelter prop in the virtual scene based on the interaction type.

17. The non-transitory computer-readable storage medium according to claim 16, wherein the updating a display state of the virtual shelter prop in the virtual scene based on the interaction type comprises any one of the following:

moving the virtual shelter prop from the first position to a second position of the controlled virtual object for display in response to the interaction type being a first interaction type, and displaying that the virtual shelter prop at the second position does not shelter the target virtual prop; and erecting the target virtual prop at a reference position of the virtual shelter prop in response to the interaction type being a second interaction type, and zooming in and displaying the virtual shelter prop.

\* \* \* \* \*